(12) United States Patent
Ruotsalo et al.

(10) Patent No.: US 9,798,780 B2
(45) Date of Patent: Oct. 24, 2017

(54) LOW-DIMENSIONAL INFORMATION DISCOVERY AND PRESENTATION SYSTEM, APPARATUS AND METHOD

(71) Applicants: University of Helsinki, Helsingin Yliopisto (FI); Aalto University Foundation, Aalto (FI)

(72) Inventors: Tuukka Juhani Ruotsalo, Helsinki (FI); Jaakko Tapani Peltonen, Espoo (FI); Manuel J. A. Eugster, Espoo (FI); Petri Jukka Myllymäki, Helsinki (FI); Giulio Jacucci, Espoo (FI); Samuel Kaski, Espoo (FI); Dorota Glowacka, Helsinginyliopisto (FI)

(73) Assignees: University of Helsinki, Helsingin Yliopisto (FI); Aalto University Foundation, Espoo (FI)

( * ) Notice: Subject to any disclaimer, the term of this patent is extended or adjusted under 35 U.S.C. 154(b) by 314 days.

(21) Appl. No.: 14/501,292

(22) Filed: Sep. 30, 2014

(65) Prior Publication Data

US 2015/0088871 A1    Mar. 26, 2015

(51) Int. Cl.
*G06F 7/00*    (2006.01)
*G06F 17/30*    (2006.01)

(52) U.S. Cl.
CPC .... *G06F 17/3053* (2013.01); *G06F 17/30867* (2013.01)

(58) Field of Classification Search
CPC .......... G06F 17/3053; G06F 17/30867; G06F 17/30554; G06F 17/30864; G06F 17/30528

USPC ......................................................... 707/723
See application file for complete search history.

(56) References Cited

U.S. PATENT DOCUMENTS

| 2012/0203752 A1* | 8/2012 | Ha-Thuc | ........... G06F 17/30705 |
| | | | 707/706 |
| 2012/0278321 A1* | 11/2012 | Traub | ................ G06F 17/30657 |
| | | | 707/736 |

OTHER PUBLICATIONS

Hearst, Marti A., "New Book: Search User Interfaces", Cambridge University Press, ISBN: 9780521113793, First Edition, 2009, 404 pages. Available at: http://searchuserinterfaces.com/book/.

(Continued)

*Primary Examiner* — Hosain Alam
*Assistant Examiner* — Nicholas Allen
(74) *Attorney, Agent, or Firm* — Ziegler IP Law Group, LLC

(57) ABSTRACT

A search system configured to predict further search intents of a user and to perform exploratory further searches and produce a number of search features and associated relevances and divergence quantifiers for displaying by user equipment at least two-dimensional so as to allow the user to identify relationship of various diverging search terms and to rapidly direct the searching towards information the existence of which may have been previously unknown to the user. Some of the search features can be concealed and shown to the user only if the user magnifies the corresponding area on a display showing the search features returned by the search engine. Files matching to varying degree with the present and predicted further searches are shown to the user with respective lists of search features.

7 Claims, 4 Drawing Sheets

(56) References Cited

OTHER PUBLICATIONS

Auer, Peter, "Using Confidence Bounds for Exploitation-Exploration Trade-offs", Graz University of Technology, Journal of Machine Learning Research, vol. 3, 2002, pp. 397-422.

Bates, Marcia J., "Where Should the Person Stop and the Information Search Interface Start ?", An International Journal of Information Processing and Management, vol. 26, No. 05, Feb. 22, 1990, pp. 575-591.

Draper, Geoffrey M. et al., "A Survey of Radial Methods for Information Visualization", IEEE Transactions on Visualization and Computer Graphics, Draft, Dec. 22, 2008, pp. 1-45.

Glowacka, Dorota, et al., "Directing Exploratory Search: Reinforcement Learning from User Interactions with Keywords", Proceedings of the 2013 international conference on Intelligent user interfaces, ISBN: 978-1-4503-1965-2, Santa Monica, CA, USA, Mar. 19-22, 2013, pp. 117-127.

Hearst, Marti A., et al., "Reexamining the Cluster Hypothesis: Scatter/Gather on Retrieval Results", In Proceedings of the Nineteenth Annual International ACM SIGIR Conference, Zurich, Aug. 1996, pp. 76-84.

Kelly, Diane, et al., "Elicitation of Term Relevance Feedback: An Investigation of Term Source and Context", Proceedings of the 29th Annual International ACM SIGIR Conference on Research and Development in Information Retrieval, Seattle, Washington, USA, Aug. 6-11, 2006, pp. 453-460.

Kelly, Diane, et al., "A Comparison of Query and Term Suggestion Features for Interactive Searching", Proceedings of the 32nd Annual International ACM SIGIR Conference on Research and Development in Information Retrieval, SIGIR 2009, Boston, MA, USA, Jul. 19-23, 2009, pp. 371-378.

Ruotsalo, Tuukka, et al., "Supporting Exploratory Search Tasks with Interactive User Modeling", Proceedings of the American Society for Information Science and Technology, vol. 50, Issue 01, Nov. 1-6, 2013, 10 pages.

Teevan, Jaime, et al., "The Perfect Search Engine Is Not Enough: A Study of Orienteering Behavior in Directed Search", Proceedings of the SIGCHI conference on Human factors in computing systems, Vienna, Austria, vol. 06, No. 01, Apr. 24-29, 2004, pp. 415-422.

Teevan, Jaime, et al., "Personalizing Search via Automated Analysis of Interests and Activities", Proceedings of the 28th annual international ACM SIGIR conference on Research and development in information retrieval, Salvador, Brazil, Aug. 15-19, 2005, 8 pages.

Venna, Jarkko, et al., "Information Retrieval Perspective to Nonlinear Dimensionality Reduction for Data Visualization", Journal of Machine Learning Research, vol. 11, Jan. 3, 2010, pp. 451-490.

Yee, Ka-Ping, et al., "Faceted Metadata for Image Search and Browsing", Proceedings of the SIGCHI Conference on Human Factors in Computing Systems, Apr. 5-10, 2003, 08 pages.

Zhai, Chengxiang, et al., "A Study of Smoothing Methods for Language Models Applied to Information Retrieval", ACM Transactions on Information Systems, vol. 22, No. 02, Apr. 2004, pp. 179-214.

\* cited by examiner

Fig. 5

Articles [show bookmarked (0)]

◉ IMAGE-ANALYSIS AND COMPUTER VISION IN MEDICINE
*T PUN, G GERIG, O RATIB* (COMPUTERIZED MEDICAL IMAGING AND GRAPHICS, 1994-01-01)

medical imaging    image analysis    computer vision    features extraction
segmentation    reconstruction    matching    recognition    artificial intelligence
research    image Multimedia lives with images; medical im...

◯ COMPUTER VISION ON A COLOR-BLINDNESS PLATE
*Y S CHEN, Y C HSU* (IMAGE AND VISION COMPUTING, 1995-01-01)

color blindness plate    image segmentation    pattern recognition    perception
computer vision    color    recognition    design    segmentation    image
matching    vision An approach is presented to computer vis...

◯ Vlfeat an open and portable library of computer vision algorithms
Andrea Vedaldi, Brian Fulkerson   (Conference On Image And Video Retrieval, 2010-01-01)

computer vision    image classification    object recognition    visual features
population    research    vision Vlfeat is an open and portable library o...

◯ IMAGE-ANALYSIS AND COMPUTER VISION - 1993
*A ROSENFELD* (CVGIP-IMAGE UNDERSTANDING, 1994-01-01)

perception    computer vision    color    image analysis    pattern recognition
recognition    application    segmentation    shape    image
artificial intelligence    matching    vision    features This paper presents a bibliography of de...

☐ 232

☐ machine vision
☐ image
☐ modelling
☐ dial indicator
☐ vfd inspection
☐ application
☐ computer vision
☐ real-time
☐ inspection
☐ vision system ( Update selected to 1 )

LOW-DIMENSIONAL INFORMATION DISCOVERY AND PRESENTATION SYSTEM, APPARATUS AND METHOD

TECHNICAL FIELD

The present application generally relates to low-dimensional information discovery and presentation system, apparatus and method.

BACKGROUND

This section illustrates useful background information without admission of any technique described herein representative of the state of the art.

The progress of mankind has largely been based on collective accumulation of information that has been enabled by recording and dissemination of information in written form. The efficiency of data retrieval has then been vastly enhanced by indexing archives and in the era of computers by development of search engines or server computers that can search given search terms within the content of documents. Such search engines are actually implemented using huge computing farms that contain numerous server computers (i.e. servers in short) and massive cooling systems to dissipate heat in order to prevent overheating of the servers. The energy and cooling price are actually prime criteria among with the fast communication connections for the choice of location of such server farms.

The need for the search engines is not about to vanish: to the contrary, the mankind is increasingly replacing books with computers of various kinds. In education, the emphasis is increasingly shifted from memorizing details to understanding relationships of events and phenomena, as the details can always be fetched from search engines, with the benefit that such details can be up to date unlike the memorized information.

It is apparent that there is no way to avoid the increase and/or expansion of server farms that are needed for search engines, but yet it is desirable to increase the efficiency of the search engines for the imminent environmental needs as well as for reducing complexity so that also reliability may be improved. Moreover, some embodiments of the present invention aim at further improving the search of information so that needed information could be found faster and the users could sooner switch off their own devices and move on to doing something else.

SUMMARY

According to a first example aspect of the invention there is provided a method in a search system comprising:
  receiving a current search request from a user for new or updated search of information, the current search request comprising user input that comprises at least one of: a search query feature; an indication of interest in particular search features; and a request to resume to any preceding search state; a bookmark identifying a file; and a bookmark identifying an earlier search feature; and
  in response to the receiving of the current search request automatically:
  forming an intent model of a current search intent of the user based on: the user input of the current search request; any earlier received search request from the user that was refined by the current search request; and a database of searchable files;
  wherein the intent model comprises or identifies at least one search feature;
  wherein the intent model further comprises a measure of the user's interest in the at least one of the search features;
  wherein the intent model further comprises a measure of uncertainty of the user's interest in the at least one of the search features;
  identifying and ranking a plurality of potential further search features according to the intent model;
  determining for each of the search features ability of the search feature in question to change the intent model based on the database of searchable files;
  establishing a summarized representation of the intent model and search features predicted as potentially relevant by the model and a summarized representation of the determined ability of the predicted potentially relevant search features to change the intent model;
  identifying and ranking a plurality of files according to their estimated relevance according to the intent model and the uncertainty of the estimated relevance; and
  sending to the user an output set comprising at least one of: a representation of the intent model; a representation of the search features predicted as potentially relevant by the model; a representation of the predicted relevance of the one or more search features; a representation of predicted relative relevance of the one or more search features; a representation of ability of the predicted potentially relevant search features to change the intent model; an identification of one or more of the identified files; a representation of relevance of the one or more identified files; a representation of relative relevance of the one or more identified files; a representation of the ranking of the one or more identified files.

The current search request may refer to a search request that is the latest search request received from the user.

The method may further comprise ranking files based on a language model. The language model may be a probabilistic multinomial language model.

The indication of interest in particular search features may comprise indicating disinterest in the particular search features.

The searchable files may be documents. The documents may contain text. The documents may comprise visual information. The documents may comprise images. The documents may comprise video recordings.

The representation of the relevance of one or more identified files or the representation of the ranking of the one or more identified files may comprise for each of the one or more identified files a list of search features that are comprised by both the intent model and the identified file in question.

The search features may be referred to as keywords.

The search feature may be a descriptor other than keyword.

The measure of the user's interest in the at least one feature may be a numerical value. The measure of the user's interest in the at least one of the search features may be updated by obtaining further indication of the user's interest or disinterest in given search features.

The forming the intent model may comprise estimating relevances of the search features. The forming the intent model may further comprise estimating a search feature weight vector to map search feature features to relevance scores that are produced in the estimating the relevances of the search features.

The measure of uncertainty of the user's interest in the at least one feature may be determined by predicting relevance of a search feature across further searches.

The potential of search features to change the intent model may be determined by defining search features that similarly allow the user to direct searching in plural further alternative searches.

The identifying and ranking a plurality of potential further search features according to the intent model may comprise performing plural further searches and determining how different search features appear in files that match with the further searches.

The summarized representation of the intent model and search features may comprise a relevance vector. The summarized representation of the intent model and search features may consist of identification of the search features of the output set and of the relevance vector.

The summarized representation of the ability of the predicted potentially relevant search features to change the intent model may comprise a divergence indication for each of the search features of the output set.

The divergence indication may quantify correspondence of each search feature of the output set with at least one other search feature of the output set.

The method may comprise establishing the at least one search feature by the search system if not contained or indicated by the current search request. The establishing of the at least one search feature by the search system if not contained or indicated by the current search request may enable a user to start an exploratory search without defining any starting point at all.

According to a second example aspect of the invention there is provided a method in a search system, comprising:
receiving an information search request for a new search or for updating an earlier search; and
in response to the receiving of the search request automatically:
performing a first information search based on first information search criteria to produce a first set of search features and associated relevance and divergence quantifiers;
determining second information search criteria for divergent further searches based on results of the first information search;
performing a plurality of further searches based on the second information search criteria to produce at least one second set of search features and associated relevance and divergence quantifiers; and
replying to the information search request with at least a subset of: the first set and the at least one second set.

The method may further comprise determining for the search features of the first and second set the similarity of their ability to diverge further searching.

The method may further comprise identifying at least one file based on the first and second set. The method may further comprise replying to the information search request with an identification of the at least one file.

The method may comprise estimating a search feature weight vector to map search feature features to respective divergence quantifiers.

The method may further comprise determining for the first set of search features associated uncertainty quantification of the uncertainty of the user's interest in the features. The method may further comprise replying to the information search request with the quantification of the uncertainty.

The method may further comprise determining for the second set of search features associated quantification of the uncertainty of the user's interest in the features. The method may further comprise replying to the information search request with the quantification of the uncertainty.

According to a third example aspect of the invention there is provided a method in a search system, comprising:
receiving a search request;
in response to the receiving of the search request automatically:
determining at least one search feature based on the search request;
performing an information search based on the at least one search feature and determining further search features that represent diverging search directions for further searches;
performing a series of further searches based on the identified further search features;
computing relevances and divergences for at least a subset of: the at least one search feature and the further search features; and
responding to the search request with search results that identify the subset of search features with respective relevances and divergences.

The method may further comprise identifying a current search intent of a user. The current search intent may comprise or identify at least one search feature.

The method may further comprise forming an intent model. The intent model may be formed using language modeling. The intent model may be formed using language modeling based on the current search intent. The forming of the intent model may be further based on a database of searchable files.

The method may further comprise identifying alternative future search intents. The identifying of alternative future intents may be based on the database of searchable files.

The method may further comprise identifying and ranking a plurality of search features. The plurality of search features may be identified and ranked according to the intent model.

The user may be a human being. Alternatively, the user may be a machine with artificial intelligence.

The method may further comprise receiving a request for a supplementary information search. The request for the supplementary information search may comprise user feedback. The user feedback may contain an indication of changed relevance for one or more search criteria.

The method may further comprise performing a supplementary search based on user feedback. The method may comprise supplementary information searching based on the user feedback. The supplementary information searching may comprise establishing further search criteria for one or more divergent further searches. The supplementary information searching may further comprise performing one or more divergent further searches based on the further search criteria. The supplementary searching may further comprise producing supplementary search output set that comprises search features and relevance and divergence quantifiers that are associated with the search features.

The method may further comprise replying to the request for the supplementary information search with at least a subset of the supplementary search output set.

The method may comprise identifying relationships between different files. The divergence quantifiers may indicate similarity or divergence of different files based on the identified relationships. The similarity may be based on language modeling based role or context of the search features. The similarity may be based on searches performed by users causing conducting of searching according to the method. The similarity may be established based on a similar role in which same search features appear in similar context in potential articles or documents. The similar role may be established when the significance of the search features develops similarly in alternative new searches.

The language modeling may be established using a multinomial unigram language model. Features of searched files may be construed based on the language model such that interpretation is made among plural alternatives according to context of the features.

The search features may be selected from a group consisting of: words; phrases; expressions; file types; file originators; file source locations or regions; authors; creation dates of the file; creation times of the file; linkages with other features; backward citations to other files; forward citations to other files; popularities of files; popularities of portions of files; and metadata items of the file.

The method may comprise forming the subset of the search features with which the search request is responded based on one or more global or local criteria.

The method may be performed using a database of files. The database may comprise more than 10 million files. The searching and the supplementary searching may be performed substantially instantaneously so as to enable the user to interactively and rapidly identify desired information. The interactive searching and predictive identifying of further searches may enable the user to complete searches that much faster than existing typed query searches that computing power may be saved at least in session management and communication resources compared to performing greater number of search rounds with typed query searching. The method may enable performing searches that are impossible to execute with simple use of pen and paper.

The method may be performed independent of both the user and user equipment from which the search request is received. The independent searching may enable logical and efficient searching even if the user of given user equipment changes or if the user chooses to search something entirely different than her earlier searches. The independent searching may provide the user with greater freedom of choice with desired progression of the search and accelerate the finding of an ultimately desired file.

The method may be performed by at least one processor. The processor may execute the method according to computer executable program code. The computer executable program code may be stored in a non-transitory memory medium. The receiving of search requests may be performed using an input. The input may comprise a local area network interface. The method may output information in response to the search requests using an output. The output may comprise a local area network interface. The method may comprise storing searchable files in a database. The database may be configured to enable multiple parallel requests in different portions thereof. The database may be a clustered database.

The search system of any of the example aspects may comprise at least one server computer. The search system may comprise at least one virtual server. The virtual server may be a computer software implemented functionality run by a plurality of server computers. The plurality of server computers may form the virtual server by cloud computing. The search system may comprise a search engine. The search engine may be at least in part implemented by software run by a computer.

According to a fourth example aspect of the invention there is provided a method for interfacing with a low-dimensional search system, comprising:

issuing an information search request to the low-dimensional search system; and responsively:
  receiving search results that identify a plurality of search features classified at least by their relevances and divergences; and
  displaying at least a subset of the search results to a user so that relevance of individual search features is indicated by a first dimension and relationship of the individual search features is indicated by a second dimension.

The method may be performed in user equipment. The user equipment may be a handheld device. The user equipment may be a personal computer. The user equipment may be a mobile phone. The user equipment may be a tablet computer. The user equipment may be an electronic book. The user equipment may be a navigation device. The user equipment may be a game device. The user equipment may be a camera. The user equipment may be a wearable device. The user equipment may be a health diagnostics device. The user equipment may be an information screen. The user equipment may be a television. The performing of the method may be triggered by a user command.

The search results may further comprise search results for alternative further searches.

The indicating of the relationship of the individual search features by the second dimension may enable the user to quickly and intuitively understand interrelations of the search features and how the searching could be developed towards the information desired by the user.

The first dimension may be distance from a reference point.

The second dimension may be an angle or sector.

The term low-dimensional may refer to more than one dimensions. The term low-dimensional may refer to less than four or less than five dimensions.

The relationship of the individual search features may be indicated by the second dimension and a third dimension that differs from the first and second dimension.

The third dimension may be an angle or vector in a plane perpendicular to that of the second dimension.

Similar search features may be displayed near each other.

The indicating of the relationship of the individual search features may comprise user perceivably presenting proximate search features close to each other. The indicating of the relationship of the individual search features may comprise user perceivably presenting divergent search features far from each other. The divergent search features may be presented opposite to each other with respect to the second dimension.

The search results may comprise identification of search features connecting different files with each other.

The search results may comprise diverging search features that are suited for directing searching to different directions.

The search results may comprise a set of search features that are considered by the search system as not relevant for the search request. That the search results comprise search features considered as not relevant may enable the user to arrive at desired information with fewer iteration rounds. That the search results comprise search features considered as not relevant may enable the user to enhance her understanding and thus facilitate the developing of the search.

The method may further comprise allowing the user to change mutual alignment of displayed search features. The changing of the mutual alignment of displayed search features may be detected using an input device. The input device may be or comprise a touch screen. The input device may be or comprise a computer mouse. The input device may be or comprise a gesture detection system. The input device may be or comprise a gesture detection cloth or glove. The input device may be or comprise a voice command recognition device. The input device may be or comprise an eye movement detection device. The input device may be or comprise a brain operation detection device. The method may further comprise issuing to the search system a new search request based on estimated new relevance and mutual correspondence of the search features as indicated by the change of the mutual alignment of the displayed search features.

The allowing the user to change the mutual alignment of the displayed search features may enable the user to intuitively indicate how much given search features interest the user.

The search results may be displayed in polar co-ordinate system such that the relevance is identified by radius and the correspondence by angular alignment.

The search results may further comprise a list of files. The list of files may identify a plurality of files. The list may identify possible related search features for each of the listed files. At least a subset of the list of files may be presented alongside with a low-dimensional presentation of search features. The method may further comprise allowing the user to select any of the related search features presented in the list.

The method may further comprise allowing the user to magnify a given portion of the low-dimensional visualization and displaying more search features in the magnified given portion.

Search features with highest relevance in each cluster or group of mutually corresponding search features may be shown with labels characterizing the cluster. Other search features may be shown as dots. The dots may be expanded to search features on the magnifying.

The search results may comprise more than thousand search features. The search results may comprise more than ten thousands of search features. Most of the search features may be concealed until the visualization is magnified at a portion corresponding to location of the search features in the low-dimensional visualization.

The search results may be received in compressed form such that repeating part of the search results is algorithmically expressed and a residual term is used to express varying subset of the search results. On sending an updated search request, previously received search results may be stored and new search results may be decompressed using the existing search results for differential coding of new search results.

The method may enable finding information the existence of which was unknown to the user before the searching.

The method may significantly accelerate a man-machine interface in information searching and significantly advance the technical field of user interfacing. The method may further contribute to enabling efficient search of information with less user equipment that has restricted display capabilities. Low-dimensional presentation of search features or simultaneous presentation of relevance and correspondence of search features may enable efficient user interfacing with smaller, more power efficient, more compatible and/or more transportable devices. The method may transform a previously known search system into a significantly more efficient and capable search system.

The indication of interest may be performed by manipulating the visualization of presented search features. The manipulating may be performed by detecting a gesture by the user in indication of moving one or more search features with relation to the visualization. The manipulating may be gestured by dragging the one or more search features.

Different dimensions may be indicated in using different directions on a two-dimensional or three-dimensional display. Further dimensions may be indicated by varying any one or more of the following: shape; size; color; and text type of a search feature or an indicator of the search feature (such as e.g. a sign or character demonstrating a compacted search feature).

According to a fifth example aspect there is provided an apparatus comprising a memory comprising computer executable program code and a processor configured to control the apparatus to perform according to the program code the method of any preceding aspect or embodiment.

According to a sixth example aspect of the invention there is provided user equipment for interfacing with a low-dimensional search system, comprising:
 a memory configured to store computer executable program code;
 at least one processor;
 a communication circuitry; and
 a user interface;
 the at least one processor being configured to perform under control of the program code:
 issuing an information search request to the low-dimensional system; and responsively:
 receiving search results that identify a plurality of search features classified at least by their relevance and mutual divergence; and
 displaying the search results by the user interface to a user so that relevance of individual search features is indicated by a first dimension and relationship of the individual search features is indicated by a second dimension.

Different non-binding example aspects and embodiments of the present invention have been illustrated in the foregoing. The embodiments in the foregoing are used merely to explain selected aspects or steps that may be utilized in implementations of the present invention. Some embodiments may be presented only with reference to certain example aspects of the invention. It should be appreciated that corresponding embodiments may apply to other example aspects as well.

BRIEF DESCRIPTION OF THE DRAWINGS

For a more complete understanding of example embodiments of the present invention, reference is now made to the following descriptions taken in connection with the accompanying drawings in which:

FIG. 5 shows an embodiment of intent list visualization.

DETAILED DESCRIPTION OF THE DRAWINGS

An example embodiment of the present invention and its potential advantages are understood by referring to FIGS. 1 to 4. In the following, like reference signs denote like elements.

Figure 1:
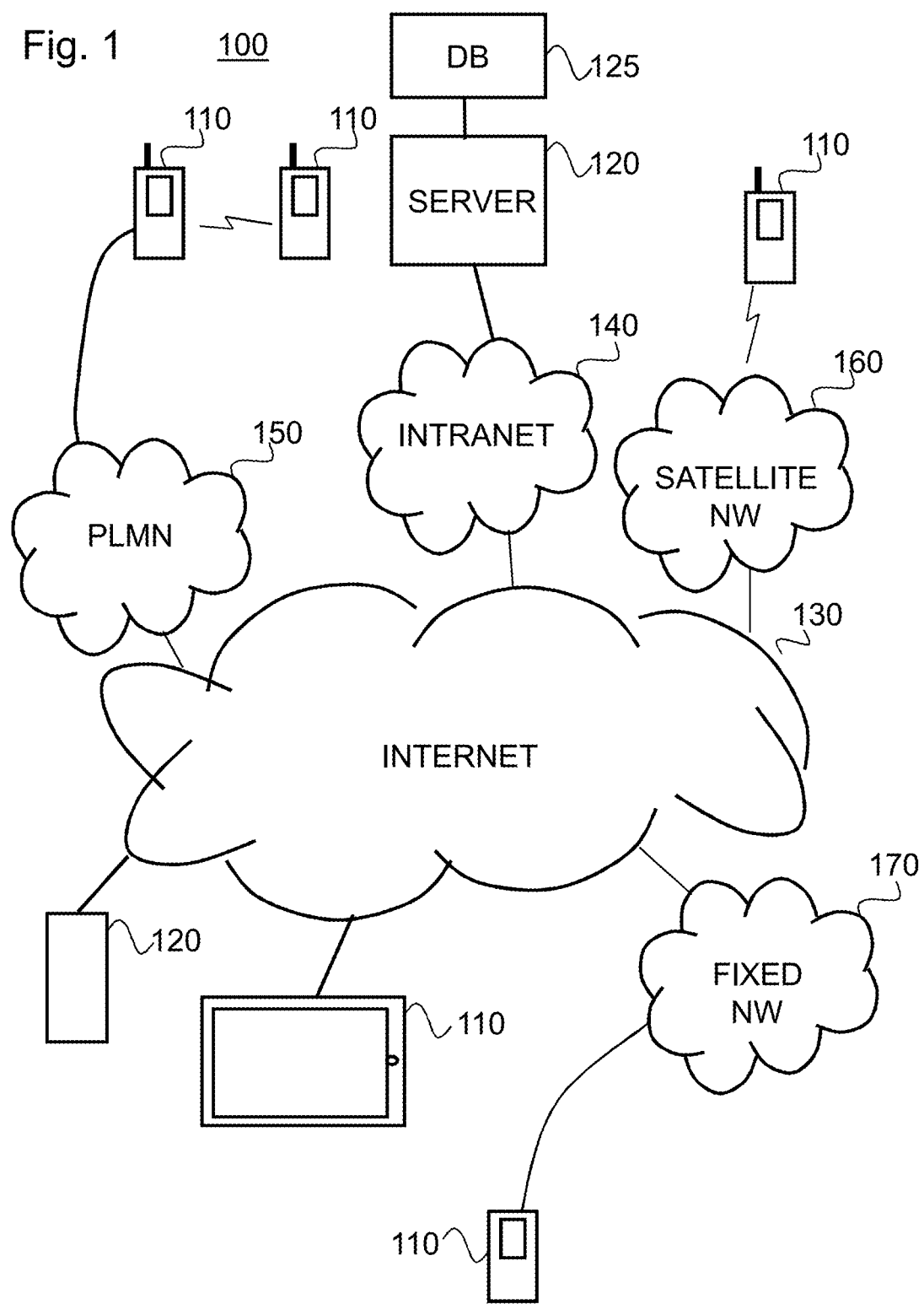
FIG. 1 shows a schematic picture of a system according to an embodiment of the invention.

FIG. 1 shows a schematic picture of a system 100 according to an embodiment of the invention. The system comprises a plurality of communication channels that are permanently or on demand formed between different entities e.g. through different networks such as packet data networks. FIG. 1 illustrates the Internet 130, a public land mobile network 150, an intranet 140 (e.g. of an enterprise or corporation), a satellite network 160 and a fixed network 170 that are in sake of simplicity connected only via the Internet 130 although it should be understood that any connections between any of the drawn networks are possible. It is also appropriate to remind in this early stage that not all the networks or other elements in FIG. 1 or any other Fig. of the present drawing need to be present in all embodiments and that the drawing is merely illustrational: for example, one element may exemplify a group of many units and unitarily drawn element may be implemented using two or more discrete units or parts.

The communication between different parts of system 100 can be based on packet switched communications such as the asynchronous transfer mode (ATM) or internet protocol (IP) communications. The routing of data packets can be arranged using routers, switches and suitable cabling to pass data traffic between different mutually communicating entities. Also firewalls can be employed, possibly with stateful or stateless network access translating (NAT). Data sessions may be maintained by various network elements for duration depending on the length of time that communications are needed e.g. for conducting searching of information. The system 100 may be designed and constructed such that its capacity suffices for the sessions required for fluent operation under designed use.

FIG. 1 presents, for simplifying explanation of some embodiments, different kinds of user equipment 110, a server 120, and a database 125 accessible to the server 120. The user equipment 110 can be formed e.g. of a smart phone, personal computer, tablet computer, navigation device, game console or another communication enabled computer programmable device with computer program or firmware adaptation to support at least one embodiment of the present document. The server 120 is formed e.g. of a personal computer, server computer, virtual computer, or a cluster of computers forming a functional server machine, and of suitable software or firmware logic control to enable the server 120 to support at least one embodiment of the present document.

Figure 2:
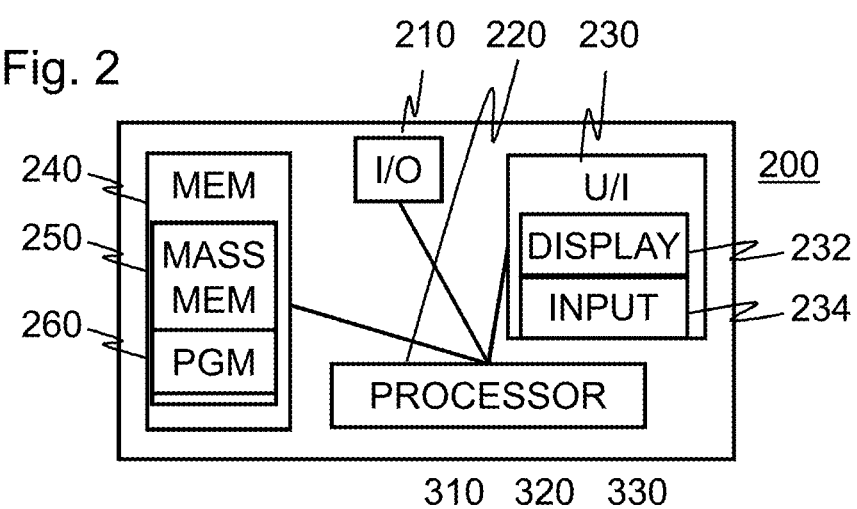
FIG. 2 shows a block diagram of user equipment according to an embodiment of the invention.

FIG. 2 shows a block diagram of user equipment 200 according to an example embodiment. The user equipment comprises an input/output 210, a processor 220, a user interface 230, a memory 240 that comprises a mass memory 250 that comprises software 260 such as an operating system, computer programs, program libraries, and/or interpretable code.

The input/output 210 comprises e.g. a communication interface for input and output of information, such as a local area network, universal serial bus, WLAN, Bluetooth, GSM/GPRS, CDMA, WCDMA, or LTE (Long Term Evolution) radio circuitry. The input/output 210 can be integrated into the apparatus user equipment 200 or into an adapter, card or the like that may be inserted into a suitable slot or port of the user equipment 200. The input/output 210 can support one wired and/or wireless technology or a plurality of such technologies.

The processor 220 may be, e.g., a central processing unit (CPU), a microprocessor, a digital signal processor (DSP), a graphics processing unit, an application specific integrated circuit (ASIC), a field programmable gate array, a microcontroller or a combination of such elements. FIG. 2 shows one processor 220, but the user equipment 200 may comprise a plurality of processors.

The user interface 230 comprises a display device 232 such as a liquid crystal display, an organic light emitting diode (OLED) display, an active-matrix organic light-emitting diode, a cathode ray display, a projector display, a digital light processing projector, and/or an electric ink display. The user interface 230 further comprises an input device 234 such as a touchpad, touch screen, computer mouse, eye tracking device, keyboard, keypad, and/or an auditive control device such as a speech recognition device for receiving voice commands or a sound detection device for recognizing commands given e.g. by clapping hands. The user interface 230 may further and/or alternatively to some parts listed in the foregoing an audio transducer configured to produce audible sounds, signals and/or synthesized and/or recorded voice.

The memory 240 may comprise a non-volatile memory 250 or mass memory, such as a read-only memory (ROM), a programmable read-only memory (PROM), erasable programmable read-only memory (EPROM), a flash memory, a data disk, an optical storage, a magnetic storage, a smart card, or the like, and a volatile or work memory such as a random-access memory (RAM) (not shown) for enabling quick execution of program code 260 by the processor 220. The memory 240 may be constructed as a part of the user equipment 200 or it may be inserted into a slot, port, or the like of the user equipment 200 by a user.

A skilled person appreciates that in addition to the elements shown in FIG. 2, the user equipment 200 may comprise other elements, such as microphones, further presentation devices such as displays and printers, as well as additional circuitry such as further input/output (I/O) circuitry, memory chips, application-specific integrated circuits (ASIC), processing circuitry for specific purposes such as source coding/decoding circuitry, channel coding/decoding circuitry, ciphering/deciphering circuitry, and the like. Additionally, the user equipment 200 may comprise a disposable or rechargeable battery (not shown) for powering the user equipment 200 when external power if external power supply is not available.

In an example embodiment, the user equipment is formed using hardwired logics in which case at least some of the program code may be omitted.

Figure 3:
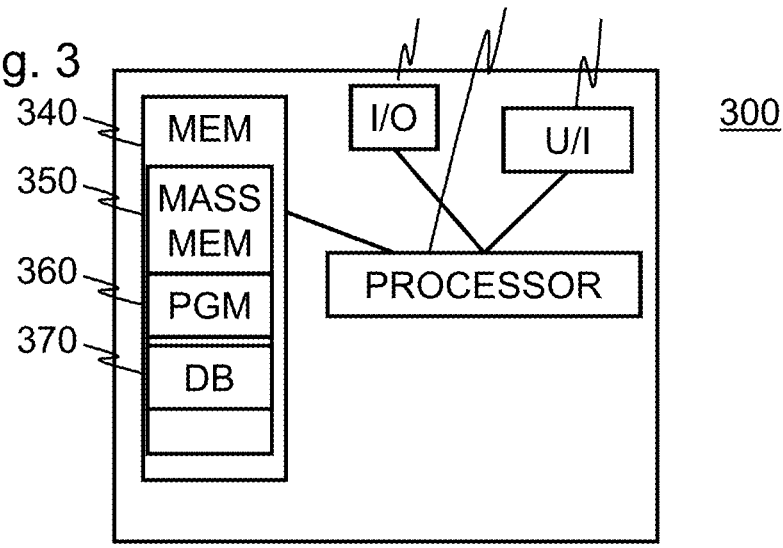
FIG. 3 shows a block diagram of a server according to an embodiment of the invention.

FIG. 3 shows a block diagram of a server according to an example embodiment The server comprises an input/output 310, a processor 320, a user interface 330, a memory 340 that comprises a mass memory 350 that comprises software 360 such as an operating system, computer programs, program libraries, and/or interpretable code. The server is also drawn to comprise a database 370 and even so that the database is contained in the mass memory 350, although the database can alternatively or additionally be comprised by another mass memory within the server or separate from the server 300 and with a suitable fast access such as a gigabit Ethernet, optical fiber connection, SCSI or PCI connection or data bus.

The input/output 310 comprises e.g. a communication interface for input and output of information, such as a local area network, universal serial bus, WLAN, Bluetooth, GSM/GPRS, CDMA, WCDMA, or LTE (Long Term Evolution) radio circuitry. The input/output 310 can be integrated into the apparatus server 300 or into an adapter, card or the like that may be inserted into a suitable slot or port of the server 300. The input/output 310 can support one wired and/or wireless technology or a plurality of such technologies.

The processor 320 may be, e.g., a central processing unit (CPU), a microprocessor, a digital signal processor (DSP), a graphics processing unit, an application specific integrated circuit (ASIC), a field programmable gate array, a microcontroller or a combination of such elements. FIG. 3 shows one processor 320, but the server 300 may comprise a plurality of processors.

The user interface 330 comprises a display device such as a liquid crystal display, an organic light emitting diode (OLED) display, an active-matrix organic light-emitting diode, a cathode ray display, a projector display, a digital light processing projector, and/or an electric ink display. The user interface 330 further comprises an input device such as a touchpad, touch screen, computer mouse, eye tracking device, keyboard, keypad, and/or an auditive control device such as a speech recognition device for receiving voice commands or a sound detection device for recognizing commands given e.g. by clapping hands. The user interface 330 may further and/or alternatively to some parts listed in the foregoing an audio transducer configured to produce audible sounds, signals and/or synthesized and/or recorded voice.

The memory 340 may comprise a non-volatile memory 350 or mass memory, such as a read-only memory (ROM), a programmable read-only memory (PROM), erasable programmable read-only memory (EPROM), a flash memory, a data disk, an optical storage, a magnetic storage, a smart card, or the like, and a volatile or work memory such as a random-access memory (RAM) (not shown) for enabling quick execution of program code 360 by the processor 320. The memory 340 may be constructed as a part of the server 300 or it may be inserted into a slot, port, or the like of the server 300 by a user.

A skilled person appreciates that in addition to the elements shown in FIG. 3, the server 300 may comprise other elements, such as microphones, further presentation devices such as displays and printers, as well as additional circuitry such as further input/output (I/O) circuitry, memory chips, application-specific integrated circuits (ASIC), processing circuitry for specific purposes such as source coding/decoding circuitry, channel coding/decoding circuitry, ciphering/deciphering circuitry, and the like. Additionally, the server 300 may comprise a disposable or rechargeable battery (not shown) for powering the server 300 when external power if external power supply is not available.

In an example embodiment, the server is formed using hardwired logics in which case at least some of the program code may be omitted.

Particular embodiments have been disclosed by the inventors in a scientific publication "Directing Exploratory Search with Interactive Intent Modeling" found from http://dx.doi.org/10.1145/2505515.2505644 and incorporated herein by reference.

Figure 4:
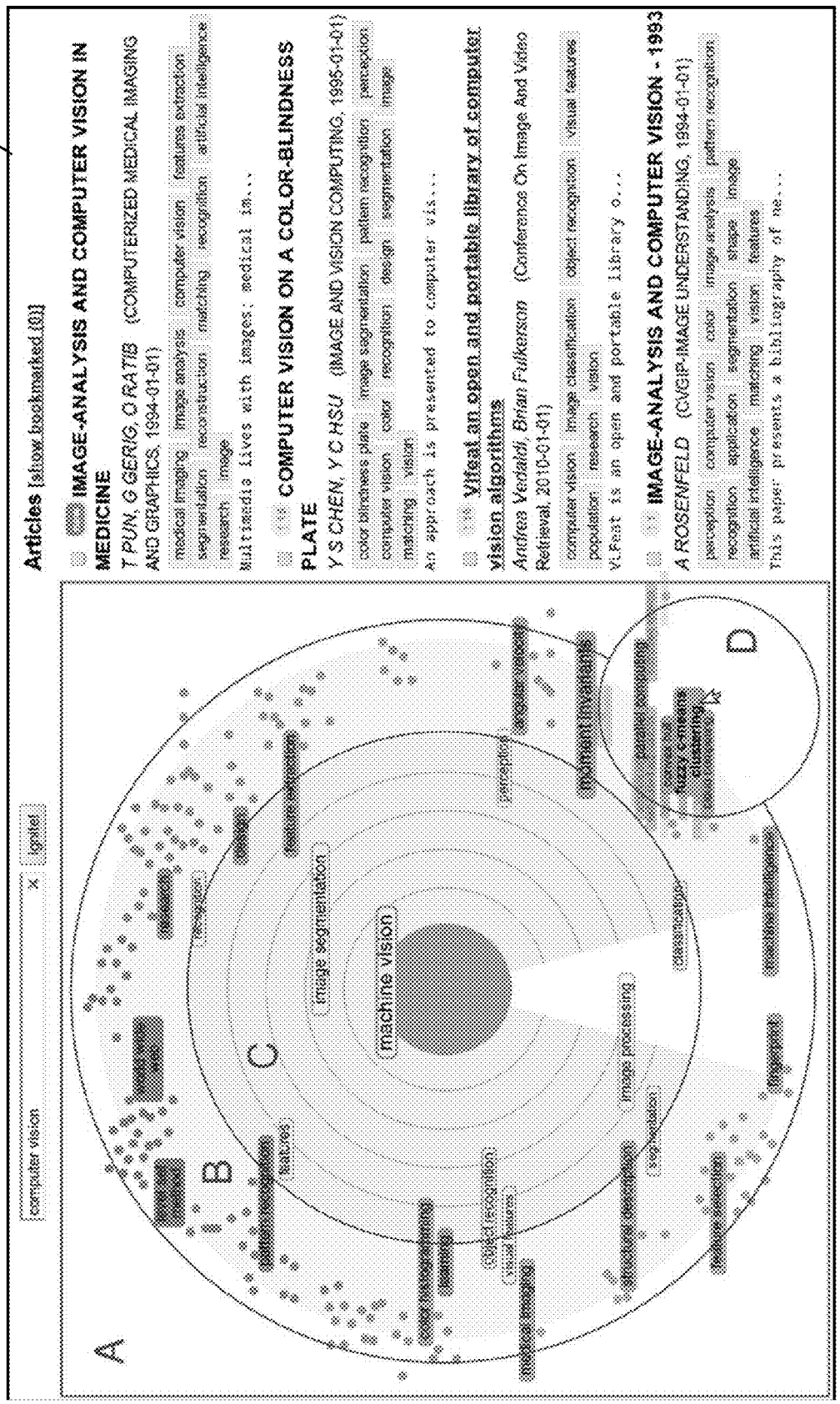
FIG. 4 shows a screen shot of a display of the user equipment 200 according to an embodiment of the invention.

FIG. 4 shows a screen shot of a display of the user equipment 200 according to an embodiment of the invention. Some example embodiments and tests and results are next described with reference to FIG. 4. These example embodiments introduce interactive intent modeling, where the user directs exploratory search by providing feedback for estimates of search intents. The estimated intents are visualized for interaction with the user on an intent radar that is a term for referring to a visual representation on the user interface. The intent radar organizes intents of a user desiring to find particular information onto a low dimensional layout such as a radial layout. Relevant intents are arranged close to a base part such as the center of the visualization. Similar intents are arranged according to one dimension, e.g. to have similar angles or sharing common sector or portion of the visualization when using the radial layout. Feedback is received from the user on the visualized intents. The system uses the feedback to learn and produce visualization of improved intent estimates. The interactive intent modeling allows users to perform direct exploration via rapid relevance feedback in an interactive model based loop where the user's search intents are estimated and visualized for interaction after each estimation cycle. This may be understood such that the user iteratively adjusts the model by relevance feedback on keywords or search features representing the current search intent. In the visualization, keywords representing estimated search intents are arranged onto gradually developing intent radar e.g. as a radial layout where relevant intents are close to the base part and similar intents have similar angles, sectors or parts or zones in the intent radar. The interactive intent modeling proved to improve the quality of retrieved information, the ability of users to target interactions to direct exploratory search, and the task performance of the users. Thus, the load on the communication network and particularly user equipment power-on time could be reduced. Moreover, it is expected that the total server processing can be reduced by more efficiently directing the search to relevant publications. Some example embodiments illustrating various techniques of providing the intent model and/or the visualization of the same are next described in greater detail.

Interactive Intent Modeling

We illustrate interactive intent modeling and the intent radar visualization by a walk-through example of an information seeking task (FIG. 4). Imagine the user issues by her user equipment a query "computer vision" to the server computer or system; the system responds with the predicted user intent and projected potential future intents along with a list of files.

User Interface.

Besides a typical query box and article list that are known from typical search systems or engines, the interface uses the intent radar visualization, which represents search intents as relevant keywords corresponding to the predicted intents. A center of the intent radar represents the user. The inner circle represents the current search intent. The outer area represents future intent projections: potential directions the user may like to follow given the current search intent estimate.

FIG. 4 shows an embodiment of the intent radar interface as shown e.g. on the display 232. Various search intents are visualized through keywords on a radial layout (A). The center area represents the user: the closer a keyword is to the center the more relevant it is to the estimated intent. The intent model used for retrieval is visualized as keywords in the inner circle (C); projected future intents are visualized as keywords in the outer circle (B). Keywords can be inspected with a fisheye lens (D).

FIG. 5 shows an embodiment of the intent list visualization e.g. as shown on the display 232. Users can provide relevance feedback by clicking keywords in the list and get a new set of files and keywords by clicking an "Update selected to 1" button. In an embodiment, the files are, for example, documents that comprise any of text; visual content; and/or audible content. For the sake of simplicity, some embodiments are described as if the files were largely textual documents or articles such as scientific articles that comprise text and graphics such as graphs and diagrams.

Returning to FIG. 4, the radius of keywords represents relevance of the keywords: the closer a keyword is to the center the more relevant the keyword is for the current estimated search intent. Angles of keywords represent the similarity of the keywords: similar angles indicate similar intents. The interface colors keywords based on a clustering to distinguish topically different search intents from each other. Keywords with highest relevance in each cluster are shown with labels to characterize the cluster, other keywords are shown as dots that can be enlarged with a fisheye lens.

The intent radar visualization uses a polar coordinate system and radial layout. This lets the visualization focus on the relation between the intents which is more important than their exact weights. With the intent radar, the user interface allows users to select directions through a non-intrusive relevance feedback mechanism, where the user pulls keywords closer to the center of the radar. The radial layout has a good tradeoff between the amount of shown information and comprehensibility: a simple list of keywords only uses one degree of freedom and does not show keyword relationships, whereas higher than two-dimensional visualizations could make interaction with the visualization more difficult. The pulling of keywords closer to the center also changes the mutual order or arrangement of the keywords and thus enables very intuitive and simple focusing or adjusting of the search.

Interaction and Feedback.

The user can provide relevance feedback for the intents by dragging a keyword on the intent radar (closer to center means higher relevance) or by clicking a keyword under a document (assigns full relevance). Also intuitively, negative relevance feedback can be simply indicated by the user by dragging a keyword outside the radar i.e. the inner and outer circles.

In a first iteration, no user feedback is available and documents and keywords are selected e.g. based on pseudo-feedback acquired from the top-ranked documents and visualized for the user. The user browses the visualization, in our example notices keywords "infrared" and "cameras", drags them towards the center of the radar, and e.g. clicks the center to retrieve new estimates of intent and documents. In another example, the intent model and the intent radar visualization are automatically updated i.e. new estimates are computed and visualized in response to the dragging of the keywords by the user. Then the system computes and visualizes new estimates for the user's current and potential future intents.

Document Retrieval Model

The following describes one way to implement a document retrieval model that enables some example embodiments. We use the language modeling approach of information retrieval to estimate the relevance ranking of documents $d_j$ given the estimate of the user's search intent. The intent model yields a keyword weight vector $\hat{v}$ having weight $\hat{v}_i$ for each keyword $k_i$. As feedback is not available on the first iteration, we start with the typed query with weight 1 as the intent model. Documents are ranked by their probability given the intent model. We use a probabilistic multinomial unigram language model. The $\hat{v}$ is treated as a (small) sample of a desired document, and documents $d_j$ are ranked by the probability that $\hat{v}$ would be observed as a random sample from the language model $M_{d_j}$ for the document; with maximum likelihood estimation we get $\hat{P}$ $(\hat{v}|M_{d_j})=\pi_{i=1}^{|\hat{v}|}\hat{P}_{mle}(k_i|m_{d_j})^{\hat{v}_i}$, and to avoid zero probabilities and improve the estimation we then compute a smoothed estimate by Bayesian Dirichlet smoothing so that $$\hat{P}_{mle}(k_i \mid M_{d_j}) = \frac{c(k_i \mid d_j) + \mu p(k_i \mid C)}{\sum_k c(k_i \mid d_j) + \mu}$$

where $c(k|d_j)$ is the count of keyword k in document $d_j$, $p(k_i|C)$ is the occurrence probability (proportion) of keyword $k_i$ in the whole document collection, and the parameter $\mu$ is set to 2000. The documents $d_j$ are ranked by $\alpha_j=\hat{P}$ $(\hat{v}|M_{d_j})$. We could just show the top ranked documents, but to expose the user to more novel documents, we sample a set of documents from the list and display them in ranked order. This favors documents whose keywords often received positive user feedback. We use Dirichlet Sampling, where a value $$f_j \sim \text{Gamma}(\alpha_j, 1) = f_b^{\alpha_j-1} e^{-f_j/\Gamma(\alpha_j)}$$

is sampled for each document dj, and the documents with highest $f_j$ are shown to the user. At each iteration, the weight $\alpha_j$ is increased by 1 for documents $d_j$ where at least one keyword got positive user feedback, and the weights are then renormalized.

Learning the Search Intent

Our model uses two main representations: the current estimate of search intent, and the alternative future intents that could occur in response to future feedback of the user; they are visualized in the inner and outer circle in FIG. 4. We represent the current estimated search intent as a relevance vector $\hat{r}^{current}$ over keywords, and the alternative future intents as a set of the same kind of relevance vectors $\hat{r}^{future,l}$ predicted into the future, called the future relevance vectors. Each vector $\hat{r}^{future,l}$, l=1, . . . , L, is a projection of the current search intent into the future in response to a set of L feedback operations the user could potentially use. The user provides relevance feedback to search intents by giving relevance scores $r_i \in [0,1]$ to a subset of J keywords $k_i$, i=1, . . . , J. Here $r_i$=1 denotes keyword $k_i$ is highly relevant to the user and she would like to direct her search in that direction, and $r_i$=0 denotes the keyword is of no interest to the user.

Estimating Keyword Relevances.

Let each keyword $k_i$ be represented as a binary n×1 vector $k_i$ telling which of the n documents the keyword appeared in. To boost significance of documents with rare keywords, we convert the $k_i$ into the tf-idf representation. We assume the relevance score $r_i$ of a keyword $k_i$ is a random variable with expected value $E[r_i]=k_i^T w$. The unknown weight vector w determines the relevance of keywords and it is estimated based on the relevance feedback given so far in the search session.

Estimating the Weight Vector.

The algorithm maintains an estimate $\hat{w}$ of the vector w which maps keyword features to relevance scores. To estimate w for a given search iteration, we use the LinRel algorithm that is known e.g. from P. Auer. Using confidence bounds for exploitation-exploration trade-offs. J. Mach. Learn. Res., 3:397-422, 2002. In each search iteration, LinRel yields an estimate $\hat{w}$. Let K be a matrix where each row $k_i^T$ is a feature representation of one of the keywords $k_i$ shown so far, and let the column vector $r^{feedback}[r_1, r_2, \ldots, r_p]^T$ contain the p relevance scores received so far from the user. LinRel estimates $\hat{w}$ by solving the linear regression $r^{feedback}=Kw$, and calculates an estimated relevance score $\hat{r}_i=k_i^T \hat{w}$ for each keyword $k_i$.

Selecting Keywords for Presentation to the User.

At each iteration the system might simply pick the keywords with highest estimated relevance scores, but if $\hat{w}$ is based on a small set of feedback, this exploitative choice could be suboptimal; or the system could exploratively pick keywords where feedback would improve accuracy of $\hat{w}$. To deal with the exploration-exploitation tradeoff we select keywords not with the highest relevance score, but with the largest upper confidence bound for the score. If σi is an upper bound on standard deviation of the relevance estimate $\hat{r}_i$, the upper confidence bound of keyword $k_i$ is computed as $\hat{r}_i + \alpha \sigma_i$, where α>0 is a constant used to adjust the confidence level of the bound. Let $r^{feedback}$ again denote the vector of all relevance scores received from the user. In each iteration, LinRel computes $s_i = K(K^T + \lambda I)^{-1} k_i$ where λ is a regularization parameter, and the keywords $k_i$ that maximize $$s_i^T r^{feedback} + \frac{\alpha}{2} \|s_i\| k_i$$

are selected for presentation; they represent the estimated current search intent and are visualized in the inner grey circle of the intent radar visualization (FIG. 4). We use LinRel since it allows, at the same time, to maximize relevance of intent estimates based on user interactions and reduce system uncertainty about the relevant intents that occurs because of limited and possibly suboptimal feedback.

Estimating Alternative Future Intents.

Our approach not only estimates user's current search intents, but also suggests potential search directions to the user. At each iteration, based on the current estimated search intent (relevance vector $\hat{r}^{current}$ over keywords), the system estimates a set of alternative future search intents (future estimates of the relevance vector). The future search intent is estimated for each of L alternative feedbacks l=1, ..., L; in each feedback l, a pseudo-relevance feedback of 1 is given to the lth keyword in the search intent visualization, the feedback is added to the feedback from previous search iterations, and LinRel is used to estimate the future relevance $\hat{r}^{future,l}$ for keywords.

Each $\hat{r}^{future,l}$ provides the user a set of keywords she would most likely be shown, if she decided to give positive feedback to the lth currently shown keyword. Thus the user gets a view of L potential search directions which can be explored in more detail.

Denote the current estimated search intent $\hat{r}^{current} = [\hat{r}_1^{current}] \ldots [\hat{r}_{N_{keywords}}^{current}]^T$, where $[\hat{r}_l^{current}]$ is the estimated relevance of the lth keyword. Future intents are estimated as the $N_{keywords} \times L$ matrix $[\hat{R}^{future}]$, where the element in row i, column l, is $[\hat{r}_i^{future,l}] \in [0,1]$, predicted relevance of the ith keyword in the next search iteration according to the lth future intent.

Layout Optimization

We optimize a data-driven layout for the search intent and alternative future intents on the intent radar interface. We optimize locations of keywords in the inner circle (representing current search intent) and keywords in the outer circle (representing future intents) by probabilistic modeling-based nonlinear dimensionality reduction.

Representation of the Outer Keywords.

We lay out the future potentially relevant keywords into the outer circle, based on their potential future relevances. Consider the matrix $[\hat{R}^{future}]$ of predicted future keyword relevances across a set of future search intents as discussed in Section 2.2. Each keyword $k_i$ in the outer circle can be characterized by row i of $[\hat{R}^{future}]$, that is, by the row vector $\tilde{r}_i = [\hat{r}_i^{future,1}], \ldots, [\hat{r}_i^{future,L}]$, where $[\hat{r}_i^{future,l}] \in [0,1]$ is the estimated relevance of $k_i$ in the lth future search intent.

The norm $\|\tilde{r}_i\|$ represents overall predicted relevance of keyword $k_i$ across future search intents; we use it as the radius of $k_i$ on the radar. The vector $\bar{r}_i = \tilde{r}_i / \|\tilde{r}_i\|$ then tells which future search intents make $k_i$ most relevant, that is, which direction of future intent $k_i$ is associated with. We use a radial layout in which keywords associated with similar future intents have similar angles.

Layout of Keywords in the Outer Circle.

Keywords $k_i$ and $k_j$ in the outer circle can be called neighbors if their characterizations $\bar{r}_i$, $\bar{r}_j$ are similar: the keywords most similar to $k_i$ can be described as a probabilistic neighbor distribution $$p_i = \{p(j|i)\} \text{ where } p(j|i) = \exp(-\|\bar{r}_i - \bar{r}_j\|^2 / \sigma_i^2) \cdot \left(\sum_{j'} \exp(-\|\bar{r}_i - \bar{r}_{j'}\|^2 / \sigma_i^2)\right)^{-1}$$

and the $\sigma_i$ are set as in J. Venna, J. Peltonen, K. Nybo, H. Aidos, and S. Kaski: Information retrieval perspective to nonlinear dimensionality reduction for data visualization. J. Mach. Learn. Res., 11:451-490,2010, i.e. Venna et al. On the display $k_i$ and $k_j$ appear similar in the outer circle if they have close-by directions (angles) $\alpha_i$ and $\alpha_j$; the keywords that appear most similar to $k_i$ in the outer circle can then be described by neighbor distribution $q_i = \{q(j|i)\}$ where $$q(j|i) = \exp(-|ai - aj|^2 / \sigma_i^2) \cdot \left(\sum_{j'} \exp(-\|a_i - a_{j'}\|^2 / \sigma_i^2)\right)^{-1}.$$

The task of the layout algorithm is to place keywords so that neighboring keywords on the display have neighboring characterizations. To do so, we measure the total Kullback-Leibler divergence $D_{KL}$ between the neighborhoods of display locations versus characterizations, as $(\Sigma_s D_{KL}(p_i, q_i) + \Sigma_s D_{KL}(q_i, p_i))/2$. The total divergence is a function of the angles αi of the keywords in the outer circle; we optimize the $\alpha_i$ by gradient descent to minimize the total divergence. The layout algorithm enhances information retrieval of neighboring keywords from the display layout (practically minimizing misses and false positives of such retrieval).

Highlighting of Keywords in the Outer Circle.

To highlight the structure in the outer circle layout, we apply a simple agglomerative clustering to angles $\alpha_i$ of the keywords in the outer circle. In detail, start a cluster from the keyword with the smallest angle, and iteratively add the keyword with the next largest angle into the cluster as long as the angle difference is below a threshold and the size of the cluster is smaller than a specified percentage of all keywords in the outer circle; when either condition fails start the next cluster. We show clusters using different display attributes such as different colors (and/or font, background color, and/or emphasis), and show for each cluster the label of the predicted most relevant keyword (having largest $\|\tilde{r}_i\|$).

Layout of the Keywords in the Inner Circle.

The keywords in the inner circle represent the current search intent; for each such keyword $k_l$, its radius naturally represents its current estimated relevance $\hat{r}_l \in [0,1]$. The angles $\alpha_l$ of the keywords in the inner circle should be placed consistently with the layout of the outer circle (the keywords of future search intents): since we estimate the alternative future search intents in response to an interaction with an inner keyword $k_l$, $\alpha_l$ should represent which future keywords become most relevant in the lth future search intent. We thus set $\alpha_l$ to the highest weighted mode of angles $\alpha_i$ of future keywords $k_i$, where the angle of each future keyword is weighted by the predicted future relevance $\hat{r}_i^{future,l}$. The resulting angle $\alpha_i$ of each keyword $k_i$ in the inner circle indicates which keywords would become relevant by interacting with $k_l$: thus the angles of keywords in the inner circle indicate directions of future search intent.

User Experiments

A task-based user experiment was designed to investigate the effects of interactive intent modeling on exploratory search. The advantage of a task-based setting is that it allows us to measure natural user interaction and task performance, but still retain the advantages of a controlled experiment. We setup the experiments to answer the following research questions:

1. User task performance: Does the interaction paradigm lead to better user responses in the given tasks?
2. Quality of displayed information: Does the paradigm help users reach high quality information in response to interactions?
3. Interaction support for directing exploration: Does the paradigm elicit more interaction from the user? Is the elicited interaction targeted to relevant interaction options? Does the paradigm let the user explore novel information more than a conventional system where users might be constrained by limited interaction capabilities?

Experimental Design

We chose a 2×3×5 between-subjects design with two search tasks, three system setups and five users for each task/system combination. We chose the design to avoid learning effects of users as each user only used one of the systems and performed a single task.

Three systems were created: two versions of our interactive intent modeling with different extents of intent prediction and visualization, denoted as "intent radar" and "intent list", and a conventional typed-query based system "typed query". The two systems with interactive intent modeling are as follows.

The intent radar implements the full versions of interactive intent modeling with future intent prediction and intent radar visualization as described in previous sections. The implemented system updated search results and the interface in response to interactions under three seconds. The intent list implements only intent estimation and has a simpler interface that visualizes the intent model for the user as a list. FIG. 5 shows a screen shot of this interface. The users interact with the system by typing queries and providing binary relevance feedback on keywords shown under each document, as well as on keywords in the list.

The typed query system is a query-based system, where neither intent modeling nor visualization is used. Users express their information needs only by typing queries. Keywords are visualized underneath the articles; users can use them as cues for new typed queries, but cannot directly interact with them.

Search Tasks

We chose a task type that is complex enough to ensure that some interaction is necessary for users to acquire the information to accomplish the task; is complex enough to allow users to choose the kind of interaction that best supports solving the task; and is complex enough to reveal exploratory search behavior. The tasks were defined as scientific writing scenarios, i.e., participants were asked to prepare materials to write an essay on a given topic. The assignments were (1) to search for relevant articles that they would be likely to use as reference source in their essay and (2) to answer a set of predefined questions related to the task topic.

We recruited two post-doctoral researchers to define two information seeking tasks. The task fields chosen by the experts were "semantic search" and "robotics". The experts wrote task descriptions using this template: "Imagine that you are writing a scientific essay on the topic. Search scientific documents that you find useful for this essay". To provide clear goals for exploration, the experts provided questions about specific aspects of the topic. The questions defined by the experts for the robotics tasks were: "What are the sub-fields, application areas and algorithms commonly used in the field of robotics"; for the semantic search task the questions were: "What are the techniques used to acquire semantics, methods used in practical implementation, organization of results, and the role of Semantic Web technologies in semantic search".

Procedure

We recruited 30 students from two universities to participate in the study. All the participants were graduate students with a background in computer science or a related field. In a prior background survey we ensured that every participant had conducted literature search before and was neither an expert nor a novice in the topic of the assigned search task (self-assessment on a scale from 1 to 5; we selected people who rated themselves between 2 and 4).

The basic protocol for each experiment scenario was the following: demonstration of the system (10 min) and performing of the search task by the participant (30 min). The experiments were performed in an office-like environment using standard equipment. The demonstration of the system was done by the instructor using a separate computer. All user interactions were logged with timestamps: typed queries, the documents and keywords presented by the system in response to interactions, the keywords the user interacted with, and the articles the user bookmarked.

Data

We used a dataset of over 50 million scientific documents for the Web of Science prepared by THOMSON REUTERS, Inc., and from the Digital Libraries of the Association of Computing Machinery (ACM), the Institute of Electrical and Electronics Engineers (IEEE), and Springer. The dataset contains the following information about each document: title, abstract, keywords, author names, publication year and publication forum.

Relevance Assessments

Experts conducted two types of double-blind relevance assessments. For the quality of information displayed, all documents and keywords that were presented to the participants by any of the three systems were pooled resulting in a collection of 5612 documents and 4097 keywords. The experts assessed the articles on binary scale on three levels: (1) relevance—is this article relevant to the search topic; (2) obviousness—is this a well-known overview article in a given research area; and (3) novelty—is this article an uncommon yet relevant to a given topic or specific subtopic in a given research area. These assessments constituted the ground truth for evaluating retrieval performance of the systems. The ground truth consisted of 3384 relevant documents (731 were obvious and 2653 were novel). Experts also assessed the keywords on three levels:

(1) relevance—is this keyword relevant for the topic;
(2) general—does this keyword describe a relevant subfield,
(3) specific—does this keyword describe a relevant specifier for the subfield? The Cohen Kappa test indicated substantial agreement between experts, Kappa=0.71, p<0.001. For the quality of responses of the users to the tasks, for each question answers of all participants were pooled and assessed by experts on a 5-point Likert scale.

Evaluation Aspects and Measures

User task performance was the main measure of success. It was measured using an average score of expert assessments of the participants' written answers in response to the tasks. The given written answers were evaluated by the same experts who wrote the task descriptions and conducted the article assessments. The experts scored each answer between 0 (no answer) and 5 (perfect answer). In addition, we measured the number of bookmarked relevant, obvious, and novel documents the users were displayed in response to their interactions while completing the tasks.

Quality of displayed information was measured by precision, recall, and F-measure. The measures were computed both for the documents displayed for the user, and for the keywords the user interacted with. These characterize the quality of document users were able to reach and the quality of keywords users chose to manipulate. The measures were computed with respect to the different assessment categories, so that for the documents we considered in turn either the relevant, or the obvious, or the novel documents as the ground truth; for the keywords we similarly took the relevant, general, and specific keywords in turn as the ground truth.

Interaction support for directing exploration was measured using two separate types of measures. First, we measured the number and type of interactions (typed query or interaction with the intent model). Second, we measured the type of information (novel or obvious) received in response to different types of interactions. These measures characterize how well a particular type of interaction was able to support each user to direct the search to relevant information, and in particular characterize the differences of the interaction types in finding obvious and novel information.

Results

The results are discussed in detail in the following sections corresponding to the evaluation aspects.

Task Performance

The main result of the experiments is that the users of the intent radar system achieve significantly better task performance than the users in the intent list and the typed query systems. For intent radar users' responses to the tasks are graded to be significantly better by experts than the responses of the users of the other systems. The results are statistically significant (Friedman test with post-hoc analysis, $p<0.05$ for intent radar vs. typed query, $p<0.05$ for intent radar vs. intent list). Note that, all participants were able to accomplish the tasks and completed the task in the given timeframe (no significant time differences between the systems or tasks).

Quality of Displayed Information

The two versions of the interactive intent modeling achieve substantially better performance than the typed query comparison system. The differences are statistically significant using the non-parametric McNemar's test for categorical data with Bonferroni correction to correct for the multiple comparisons ($p<0.001$).

The intent list shows slightly better performance for obvious documents. A possible explanation is that the less advanced interaction capabilities in the intent list interface, and even more limited in the typed query comparison system, make it more difficult to move away from the initial query context, thus failing to increase recall but preserving slightly better precision.

The quality of the keywords the users interacted with is significantly better (higher F-measure) for the intent radar interface than for the intent list interface, for all relevant keywords and for both subcategories (general and specific keywords). This indicates that the intent radar interface has made it easier to target interactions to more relevant keywords. Moreover, the significantly higher quality of the displayed keywords themselves can add to the users' understanding of the information seeking task and is an explanation for the increased task performance for users of intent radar.

Interaction Support for Exploration Users adopted and made use of interactive intent modeling when offered to them. In particular, users interacted with the intent radar interface twice as much as with the intent list and nearly four times more than the typed query. Typed queries were used equally in each interface, and the intent models were interacted with in cycles in which typed keywords were first issued and then intent models were used to direct the search. This indicates that users did not replace the typed queries with interaction with the intent models, but rather directed their search from the initially issued imprecise query. The users of the typed query system had trouble reaching novel information. A possible explanation is that coming up with queries was difficult for users of the typed query system as intent models were not available. This was the case even though they could see the keywords under each document returned by the system and could use them as cues for typed queries. The keywords users interacted with were highly relevant, for both intent list and intent radar; thus the elicited interaction with the intent models and the further increased interaction in intent radar were targeted to relevant interaction options.

Interestingly, the interactive intent modeling engages users to move more rapidly in the information space. Users in the intent radar and in the intent list conditions chose to use typed queries as a shortcut to a previous view; this is seen in the fact that users repeat typed queries more with the intent radar interface (14% queries were repeats) and the intent list interface (20%) than with typed query (4%). Users of the intent radar condition repeated fewer queries than the users of the simpler version, perhaps because the full interface already allows efficient movement through the visualized current and future search intents.

In terms of the interaction support it was of interest whether the interaction with the predicted intents made it possible for the users to direct the search and to reach more novel information. The results proved that users were successful in directing their search with interactive intent modeling. After directing the search via the predicted intents, users were displayed a significantly larger portion of novel documents than after typing queries. Conversely, the users were displayed a larger portion of obvious documents in response to typed queries. This suggests that the interaction with the intent model enables users to direct their search and find novel documents that are not found using the typed queries, but at the same time achieve more relevant information than conventional search systems. A similar effect is also present in the documents users bookmarked.

Users bookmarked more novel documents from the results that they received in response to interactions with the intent models, while users bookmarked more obvious documents from the results they obtained using typed queries.

Overall the results suggested that interactive intent modeling, in particular the intent radar interface, which complements future intent prediction with appropriate visualization, allowed users to reach the novel documents that were harder to find with the typed query system or in other words, reduced the computational cost of reaching these documents.

It was shown that interactive intent modeling, in which visualization is used to allow uses to engage with directing their search from initial expressions of their information needs, can significantly improve a computer system's performance in exploratory search tasks. The improvements can be attributed to improved quality of displayed information in response to user interactions, better targeted interaction between the user and the system, and improved support for directing search to achieve novel information. Interaction with intent visualization does not replace the query-typing interaction, but offers an additional complementary way to express more specific intents to direct search towards novel, but still relevant information. The improved quality of information, in particular when displayed on the intent radar interface, also transfers to improved task performance. Our findings suggest that interactive intent modeling can significantly improve the effectiveness of exploratory search.

Embodiments of the present invention may be implemented in software, hardware, application logic or a combination of software, hardware and application logic. In an example embodiment, the application logic, software or an instruction set is maintained on any one of various known computer-readable media.

If desired, the different functions discussed herein may be performed in a different order and/or concurrently with each other. Furthermore, if desired, one or more of the before-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims. It should also be noticed that any plural parts X comprising plural other parts Y means that any given part X may comprise one or more of parts Y. Moreover, the appended abstract is incorporated by reference as one example embodiment.

It is also noted herein that while the foregoing describes example embodiments of the invention, these descriptions should not be viewed in a limiting sense. Rather, there are several variations and modifications which may be made without departing from the scope and spirit of the present invention.

The invention claimed is:

1. A method in a search system, comprising:
receiving a current search request from a user for new or updated search of information, the current search request comprising user input that comprises at least one of: a search query feature; an indication of interest in particular search features; and a request to resume to any preceding search state; a bookmark identifying a file; and a bookmark identifying an earlier search feature; and
in response to the receiving of the current search request automatically:
forming an intent model of a current search intent of the user based on: the user input of the current search request; any earlier received search request from the user that was refined by the current search request; and a database of searchable files;
wherein the intent model comprises or identifies at least one search feature;
wherein the intent model further comprises a measure of the user's interest in the at least one of the search features;
wherein the intent model further comprises a measure of uncertainty of the user's interest in the at least one of the search features;
identifying and ranking a plurality of potential further search features according to the intent model;
determining for each of the search features ability of the search feature in question to change the intent model based on the database of searchable files;
establishing a summarized representation of the intent model and search features predicted as potentially relevant by the model and a summarized representation of the determined ability of the predicted potentially relevant search features to change the intent model;
identifying and ranking a plurality of files according to their estimated relevance according to the intent model and the uncertainty of the estimated relevance; and
sending to the user an output set comprising a representation of the intent model and at least one of: a representation of the search features predicted as potentially relevant by the model; a representation of the predicted relevance of the one or more search features; a representation of predicted relative relevance of the one or more search features; a representation of ability of the predicted potentially relevant search features to change the intent model; an identification of one or more of the identified files; a representation of relevance of the one or more identified files; a representation of relative relevance of the one or more identified files; a representation of the ranking of the one or more identified files.

2. The method of claim 1, further comprising ranking documents based on a probabilistic multinomial language model.

3. The method of claim 1, wherein the measure of uncertainty of the user's interest in the at least one feature is determined by predicting relevance of a search feature across further searches.

4. The method of claim 1, wherein the forming the intent model comprises estimating a search feature weight vector to map search feature features to relevance scores that are produced in the estimating of the relevances of the search features.

5. The method of claim 1, wherein the summarized representation of the ability of the predicted potentially relevant search features to change the intent model comprises a divergence indication for each of the search features of the output set.

6. The method of claim 1, further comprising establishing the at least one search feature by the search system if not contained or indicated by the current search request.

7. An apparatus, comprising:
an input configured to receive a current search request from a user for new or updated search of information, the current search request comprising user input that comprises at least one of: a search query feature; an indication of interest in particular search features; and a request to resume to any preceding search state; a bookmark identifying a file; and a bookmark identifying an earlier search feature;
an output configured to send information;
a memory configured to store computer executable program code;
at least one processor configured to execute the program code and accordingly receive the current search request from the input and in response to the receiving of the current search request to automatically:

form an intent model of a current search intent of the user based on: the user input of the current search request; any earlier received search request from the user that was refined by the current search request; and a database of searchable files;

wherein the intent model comprises or identifies at least one search feature;

wherein the intent model further comprises a measure of the user's interest in the at least one of the search features;

wherein the intent model further comprises a measure of uncertainty of the user's interest in the at least one of the search features;

identify and rank a plurality of potential further search features according to the intent model;

determine for each of the search features ability of the search feature in question to change the intent model based on the database of searchable files;

establish a summarized representation of the intent model and search features predicted as potentially relevant by the model and a summarized representation of the determined ability of the predicted potentially relevant search features to change the intent model;

identify and rank a plurality of files according to their estimated relevance according to the intent model and the uncertainty of the estimated relevance; and send, by controlling the output according to the program code, to the user an output set comprising a representation of the intent model and at least one of: a representation of the search features predicted as potentially relevant by the model; a representation of the predicted relevance of the one or more search features; a representation of predicted relative relevance of the one or more search features; a representation of ability of the predicted potentially relevant search features to change the intent model; an identification of one or more of the identified files; a representation of relevance of the one or more identified files; a representation of relative relevance of the one or more identified files; a representation of the ranking of the one or more identified files.

* * * * *